US009640935B2

(12) United States Patent
Xiao et al.

(10) Patent No.: US 9,640,935 B2
(45) Date of Patent: May 2, 2017

(54) RADIALLY POLARIZED THIN DISK LASER

(71) Applicants: HAN'S LASER TECHNOLOGY INDUSTRY GROUP CO., LTD., Shenzhen (CN); HAN'S CNC TECHNOLOGY CO., LTD., Shenzhen (CN)

(72) Inventors: Lei Xiao, Shenzhen (CN); Chengwan Gong, Shenzhen (CN); Jiantao Zhao, Shenzhen (CN); Jinbin Yang, Shenzhen (CN); Yanhua Ning, Shenzhen (CN); Yunfeng Gao, Shenzhen (CN)

(73) Assignees: HAN'S LASER TECHNOLOGY INDUSTRY GROUP CO., LTD., Shenzhen (CN); HAN'S CNC TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/034,127

(22) PCT Filed: Nov. 22, 2013

(86) PCT No.: PCT/CN2013/087687

§ 371 (c)(1),
(2) Date: May 3, 2016

(87) PCT Pub. No.: WO2015/074246

PCT Pub. Date: May 28, 2015

(65) Prior Publication Data

US 2016/0276795 A1 Sep. 22, 2016

(51) Int. Cl.

*H01S 3/06* (2006.01)
*H01S 3/08* (2006.01)

(Continued)

(52) U.S. Cl.

CPC ............ *H01S 3/0604* (2013.01); *G02B 5/001* (2013.01); *G02B 5/3066* (2013.01); *H01S 3/025* (2013.01);

(Continued)

(58) Field of Classification Search

CPC .. H01S 3/0604; H01S 3/08059; H01S 3/0941; H01S 3/042; H01S 3/0405;

(Continued)

(56) References Cited

U.S. PATENT DOCUMENTS 4,235,517 A * 11/1980 Marie ...................... G02B 6/34 330/43
4,755,027 A 7/1988 Schäfer (Continued)

FOREIGN PATENT DOCUMENTS

CN 1290415 A 4/2001
CN 101552425 A * 10/2009

(Continued)

OTHER PUBLICATIONS

Li, Jian-Lang et al., "Generation of radially polarized mode in Yb fiber laser by using a dual conical prism," Optics Letters, vol. 31, Issue 20, pp. 2969-2971 (2006).

(Continued)

*Primary Examiner* — Dung Nguyen
(74) *Attorney, Agent, or Firm* — HoustonHogle LLP

(57) ABSTRACT

A radially polarized thin disk laser comprises a pumping source (10), a collimating lens (20), a focusing lens (30), a laser gain medium (50), a heat dissipating medium (55), a Brewster biaxial cone (60), and an output lens (70) which are arranged in sequence along the laser light path. The Brewster biaxial cone (60) comprises two opposite cones and a cylinder connecting the two cones. The angles between the conical surfaces (S5,S7) and bottom surfaces of (Continued)

100

30 20 10 80 70 pump source output lens 40 58 57 the cones are the Brewster angle. The laser gain medium (50) is bonded to the heat dissipating medium (55). A laser sub-resonator is formed between the laser gain medium (50) and the output lens (70). After passing through the collimating lens (20) and the focusing lens (30), the pumping laser beam emitted from the pumping source (10) is focused on the laser gain medium (50), then the generated photons resonate in the laser sub-resonator and finally a radially polarized laser beam is outputted from the output lens (70).

16 Claims, 19 Drawing Sheets

(51) Int. Cl.

| | |
|---|---|
| ***H01S 3/0941*** | (2006.01) |
| ***H01S 3/16*** | (2006.01) |
| ***H01S 3/02*** | (2006.01) |
| ***G02B 5/00*** | (2006.01) |
| ***G02B 5/30*** | (2006.01) |
| ***H01S 3/04*** | (2006.01) |
| ***H01S 3/042*** | (2006.01) |
| ***H01S 3/081*** | (2006.01) |

(52) U.S. Cl.
CPC ............ *H01S 3/042* (2013.01); *H01S 3/0405* (2013.01); *H01S 3/081* (2013.01); *H01S 3/0804* (2013.01); *H01S 3/08054* (2013.01); *H01S 3/08059* (2013.01); *H01S 3/0941* (2013.01); *H01S 3/09415* (2013.01); *H01S 3/1611* (2013.01); *H01S 3/1618* (2013.01); *H01S 3/1643* (2013.01); *H01S 2301/20* (2013.01)

(58) Field of Classification Search
CPC ........ H01S 3/1611; H01S 3/081; H01S 3/025; H01S 3/08054; H01S 3/0804; H01S 3/1643; H01S 3/09415
See application file for complete search history.

(56) References Cited

U.S. PATENT DOCUMENTS

| | | | | |
|---|---|---|---|---|
| 5,359,622 | A | 10/1994 | Shih | |
| 5,375,130 | A | 12/1994 | Shih | |
| 6,115,400 | A | 9/2000 | Brown | |
| 6,373,868 | B1 * | 4/2002 | Zhang | H01S 3/0941 372/19 |
| 6,577,666 | B2 | 6/2003 | Erhard et al. | |
| 2006/0153257 | A1 | 7/2006 | Franjic et al. | |
| 2008/0175292 | A1 | 7/2008 | Sheik-Bahae | |
| 2010/0142049 | A1 | 6/2010 | Sawabe et al. | |
| 2012/0250719 | A1 | 10/2012 | Hodgson et al. | |

FOREIGN PATENT DOCUMENTS

| | | | |
|---|---|---|---|
| CN | 101552425 | A | 10/2009 |
| EP | 1744187 | A1 | 1/2007 |
| WO | 0109993 | A1 | 2/2001 |

OTHER PUBLICATIONS

International Search Report and Written Opinion of the International Searching Authority, mailed on Aug. 26, 2014 from International Application No. PCT/CN2013/087680, filed on Nov. 22, 2013. Thirteen pages.

International Search Report and Written Opinion of the International Searching Authority, mailed on May 26, 2014, from International Application No. PCT/CN2013/087687, filed on Nov. 22, 2013. Thirteen pages.

International Preliminary Report on Patentability, mailed on May 24, 2016, from International Application No. PCT/CN2013/087687, filed on Nov. 22, 2013. Eight pages.

Zhong, Lan-Xiang et al., "Oscillating Mode with Radial Polarization in an Active Yb Fiber Based on a Brewster Dual Conical Prism," Acta Photonica Sinica, vol. 37, Issue 3, pp. 430-434 (2008).

Newburgh, G.A. et al., "Composite Yb:YAG/SiC-prism thin disk laser," Optics Express vol. 18, No. 16, pp. 17066-17074, Aug. 2, 2010. Nine pages.

* cited by examiner

RADIALLY POLARIZED THIN DISK LASER

RELATED APPLICATIONS

This application is a §371 National Phase Application Of National Application No. PCT/CN2013/087687, filed on Nov. 22,2013. This application is related to Appl. Ser. No. 15034130, filed on an even date herewith by the same inventors, and entitled RADIAL POLARIZATION THIN-DISK LASER, both of which are incorporated herein by reference in their entirety.

FIELD OF THE INVENTION

The present disclosure relates to a laser, and more particularly relates to a disk laser with gain medium to produce radially polarized laser.

BACKGROUND OF THE INVENTION

Disk laser is a kind of all solid-state laser, which has been developing rapidly since 1994 when Adolf. Giesen et al. first invented the disk laser. Disk laser uses disk-like material as gain medium, i.e. disk gain medium, wherein the disk-like material is small in thickness and is relatively large in transverse dimension, in operation, disk laser needs to dissipate the heat of the disk gain medium. A traditional cooling system of disk gain medium includes copper heat sink, which is attached to the disk gain medium and has high thermal conductivity. Copper heat sink is provided with cooling medium microchannels. Because the region of the disk gain medium is very big and the thickness is very small, therefore the heat of the gain medium could be transferred to the cooling medium micro channels quickly and effectively, and then taken away by the cooling medium. Disk laser has some advantages, for example, disk laser can export the heat deposition in the gain medium efficiently, and reduce the thermal lens effect of the gain medium, and therefore, it is possible to achieve high power, high efficiency, and high beam quality laser output. As the disk laser has the above-mentioned advantages, thus it is widely used in national defense and military affairs, scientific research, industry manufacturing and various regions.

However, when the disk laser is in operation, the heat loaded into the disk gain medium causes the temperature of the gain medium into Gaussian distribution, i.e., the energy density in the center of the disk gain medium is relatively high, and the energy density gradually reduced from the center to the surrounding portion. As a result, the center portion of the disk gain medium has a relatively large outward expansion, and an upside-down bowl-like deformation is formed, and this is the heat lens effect of the disk laser. When disk laser is operated in high power, the heat lens effect of the disk gain medium will affect the laser output power, output stability and beam quality of the laser. If the expansion deformation of the disk gain medium exceeds the material's capability, it may even result in a disk gain medium burst.

SUMMARY OF THE INVENTION

Accordingly, it is necessary to provide a radial polarization disk laser, which can improve the heat lens effect, and increase the output stability.

A radial polarization disk laser includes a pump source, a collimator lens, a focusing lens, a laser gain medium, a heat dissipating medium, a Brewster double axial cone, and a output lens, which are sequentially arranged along a laser light path, wherein the Brewster double axial cone includes two cones facing each other and a cylinder connecting the two cones, an angle formed between a conical surface and a bottom surface of the cone is a Brewster's angle; the laser gain medium is bonded to the heat dissipating medium; the laser gain medium and the output lens form a laser harmonic oscillator cavity therebetween; wherein pumped laser emitted from the pump source passes through the collimator lens and the focusing lens, is then focused on the laser gain medium, and generated photons oscillate in the laser harmonic oscillator cavity, and then a radially polarized laser beam is finally output by the output lens.

In one embodiment, the laser gain medium is a Yb:YAG disk with a doping concentration of 5.0 at % to 15 at % or the laser gain medium is an Nd:YAG disk with a doping concentration of 1.0 at % to 5.0 at %, and the Yb:YAG disk or the Nd:YAG disk has a thickness of 0.2 to 0.5 mm.

In one embodiment, the heat dissipating medium is made of YAG crystal, a thickness of the heat dissipating medium is twice as much as a thickness of the laser gain medium.

In one embodiment, the Brewster double axial cone is made of YAG crystal, and the Brewster's angle is 61.2134°±2'.

In one embodiment, the Brewster double axial cone is made of quartz, and the Brewster's angle is 55.4°±2'.

In one embodiment, the radial polarization disk laser further includes a concave reflector group disposed at a side of the laser gain medium away from the Brewster double axial cone; wherein the pumped laser not absorbed by the laser gain medium is reflected by the concave reflector group, and then enters the laser gain medium again.

In one embodiment, the concave reflector group includes seven inner reflectors and eight outer reflectors, the seven inner reflectors and the focusing lens are arranged to form an inner ring which is symmetrical in respect to an axis of the Brewster double axial cone; and the eight outer reflectors are arranged to form an outer ring surrounding the inner ring.

In one embodiment, one surface of the laser gain medium away from the Brewster double axial cone is provided with a first two-wavelength coating, which is highly transmissive in respect to incident light and highly reflective in respect to outgoing light; and the other surface of the gain medium close to the Brewster double axial cone is provided with a second two-wavelength coating, which is highly reflective in respect to incident light and highly transmissive in respect to outgoing light.

In one embodiment, both bottom surfaces of the heat dissipating medium are respectively provided with a coating highly transmissive in respect to outgoing light.

In one embodiment, both conical surfaces of the Brewster double axial cone are respectively provided with a coating highly transmissive in respect to outgoing light.

In one embodiment, the radial polarization disk laser further includes a lens holder, a first pump head, and a first sealing cover; wherein the first pump head and the first sealing cover cooperatively form a pumping chamber to accommodate the lens holder; the concave reflector group is fixed to the lens holder; and the first sealing cover is provided with a coolant circulation system therein.

In one embodiment, the radial polarization disk laser further includes a heat sink device, a second sealing cover, and a cooling device; wherein the heat sink device defines a receiving chamber on a side thereof to accommodate the laser gain medium and the heat dissipating medium; the second sealing cover is fixed to the side of the heat sink device, the cooling device is attached to the second sealing cover, the diffusing device and the second sealing cover are both provided with coolant circulation systems.

In one embodiment, both the cooling device and the second sealing cover are provided with a tapered hole pointing towards the laser gain medium.

In one embodiment, the radial polarization disk laser further includes an output lens barrel and a third sealing cover; wherein an end of the output lens barrel and the third sealing cover cooperatively form an output lens chamber; the Brewster double axial cone is fixed to one end of the output lens barrel, the output lens is fixed to the other end of the output lens barrel, and the output lens barrel is provided with a coolant circulation system.

In one embodiment, the pumped laser emitted from the pump source has a wavelength of 940 nm.

In one embodiment, the radially polarized laser beam has a wavelength of 1030 nm.

In the above-described embodiments, the laser gain medium and Brewster double axial cone are bonded to each other, such that the thermal lens effect of the disk can be improved, and a stable output of the radially polarized laser is achieved.

BRIEF DESCRIPTION OF THE DRAWINGS

The components in the drawings are not necessarily drawn to scale, the emphasis instead being placed upon clearly illustrating the principles of the present disclosure. Moreover, in the drawings, the same reference numerals designate corresponding parts throughout the views.

DETAILED DESCRIPTION OF THE EMBODIMENTS

Figure 1:
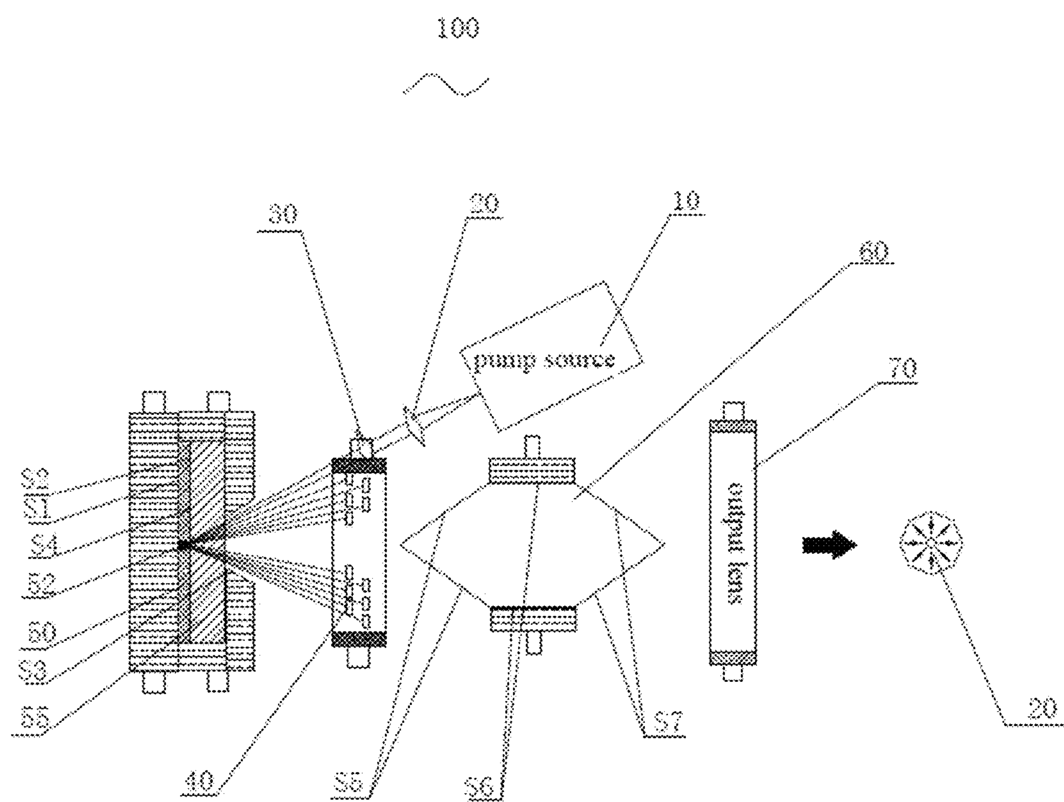
FIG. 1 is a schematic diagram of a radial polarization disk laser according to one embodiment.

Embodiments of the disclosure are described more Emily hereinafter with reference to the accompanying drawings. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Elements that are identified using the same or similar reference characters refer to the same or similar elements.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Polarization is one of the most basic features of light; commonly known polarized light includes linearly polarized light, elliptically polarized light, circularly polarized light, and radially polarized light. Because the polarization direction of radially polarized light has a perfect symmetry geometric characteristic, it has a number of different characteristics compared with linearly polarized light, elliptically polarized light, and circularly polarized light. For example, radially polarized light has a symmetry electric field distribution along the optical axis and a hollow annular shaped light beam configuration; the radially polarized light focused by high numerical lens can generate very small focal spot beyond the diffraction limit, which is much smaller than the focal spots of linearly polarized light, elliptically polarized light, and circularly polarized light, and the longitudinal electric field in the focus region is very strong; the radially polarized light only has transverse magnetic field and electrical field along the longitudinal axis; radially polarized light is polarized eigenstates, therefore when it travels in c-cut crystal, no crosstalk occurs. In recent years, these characteristics of radially polarized light have many applications. For example, in the guidance and capture of particles, particle acceleration, increasing the resolution of the microscope, metal cutting as well as increasing storage density, and the like; as people are having more in-depth knowledge of radially polarized light, it will have more and more applications in many regions.

Figure 2:
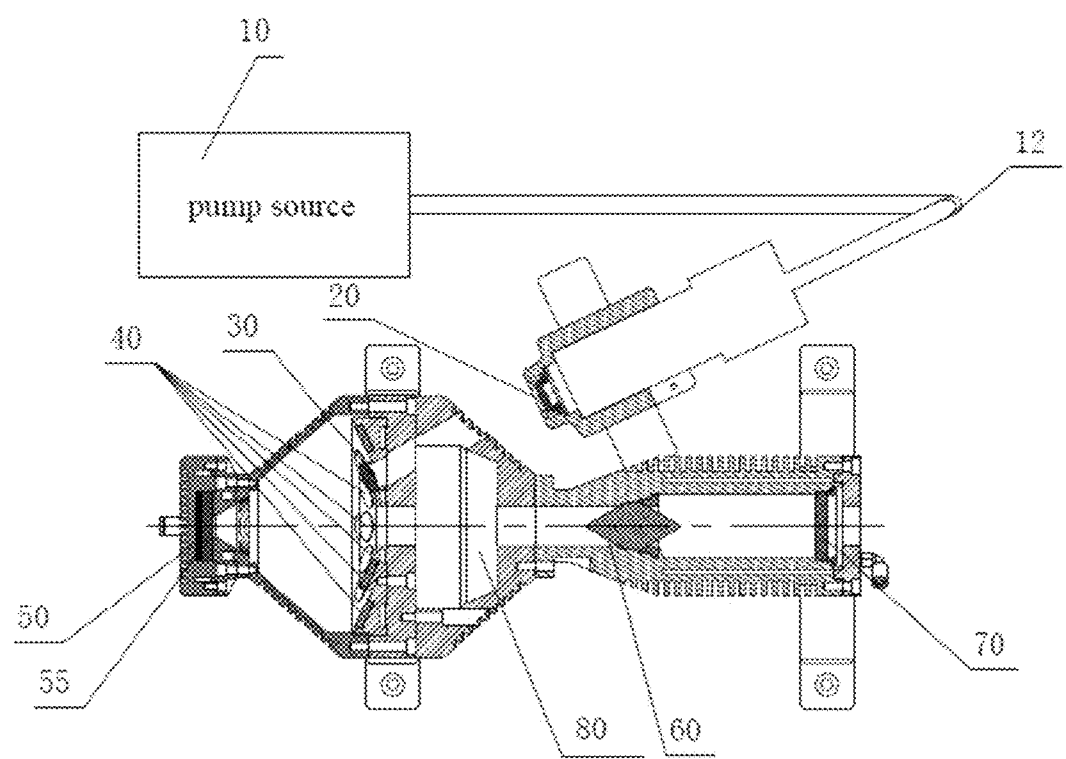
FIG. 2 is a cross-sectional view of a radial polarization disk laser according to one embodiment.
Figure 3:
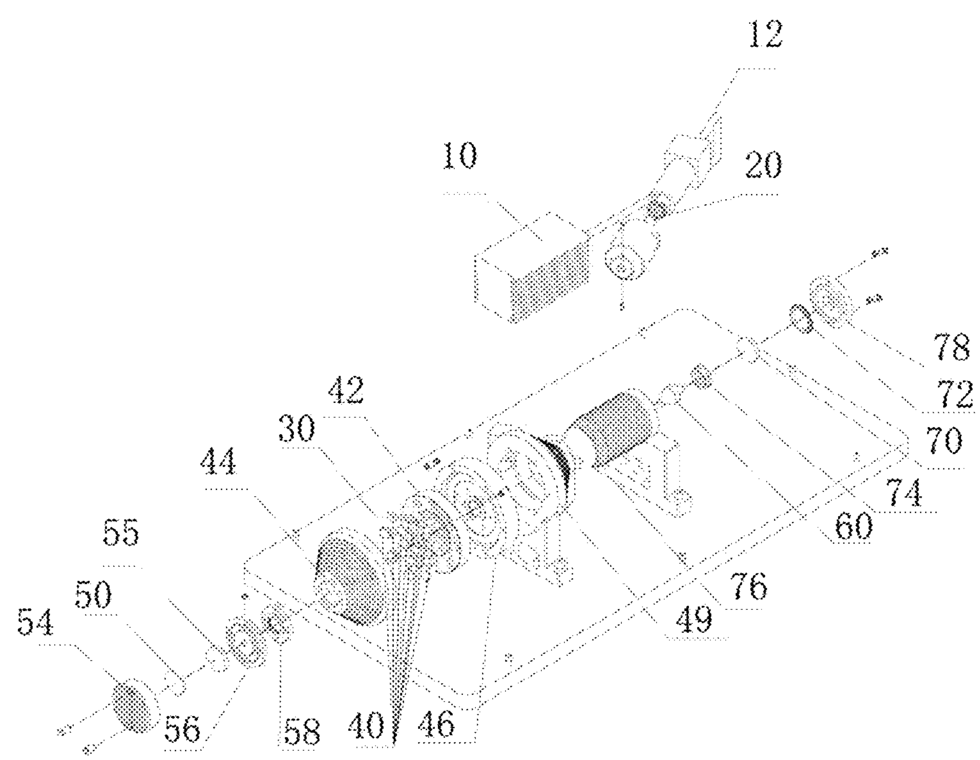
FIG. 3 is a perspective exploded view of the radial polarization disk laser as shown in FIG. 2.

Referring to FIG. 1, FIG. 2 and FIG. 3, according to one embodiment, the radial polarization disk laser 100 includes a pump source 10, a collimator lens 20, a focusing lens 30, a laser gain medium 50, a heat dissipating medium 55, a Brewster double axial cone 60, and an output lens 70, which are sequentially arranged along a laser light path. Laser beam output from the pump source 10 is transmitted via optical fiber 12, and then passes through the collimator lens 20, the focusing lens 30, and a laser spot is focused onto the laser gain medium 50; the generated photons oscillate within the laser harmonic oscillator cavity 80, and pass through the Brewster double axial cone 60 by multiple times, P-polarized photons of the polarized light are screened out, and a radial polarized laser beam 90 is finally output by the output lens 70.

The pump source 10 serves as a light source to produce the pumped laser. In the illustrated embodiment, a laser diode (LD) laser with a wavelength of 940 nm is used as the pump source.

The collimator lens 20 is fixed in a collimator lens holder 22, which is provided with a cooling water connector 24.

Figure 4A:
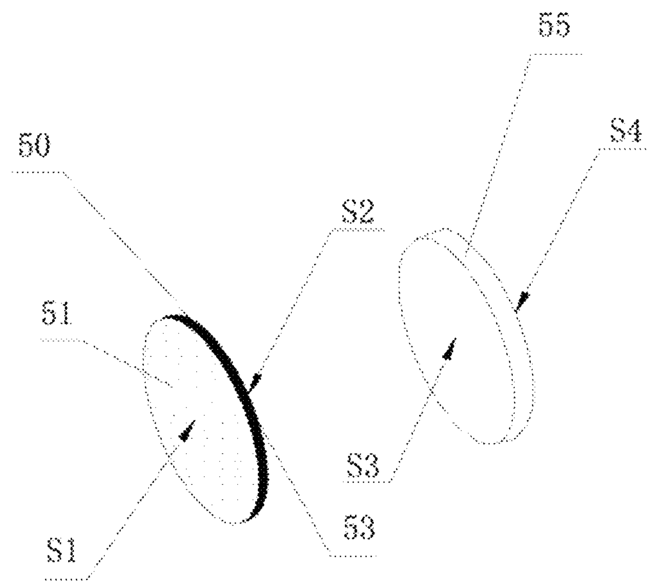
FIG. 4*a* is a perspective exploded view of the radial polarization disk laser as shown in FIG. 3.

Referring to FIG. 4*a*, in the illustrated embodiment, the laser gain medium 50 is an Yb:YAG ($Yb^{3+}$:$Y_3Al_5O_{12}$) circular disk with a doping concentration of 5.0 at % and a thickness of 0.5 mm. In other embodiments, the thickness of laser gain medium 50 can also be 0.2 to 0.5 mm, and the doping concentration can be 5.0 at % to 15 at %. $Yb^{3+}$ ions have two major absorption peaks, which are located at 938 nm and 970 nm. At 938 nm, with the absorption bandwidth up to 18 nm, it can be used as the pumping bandwidth of the laser diode (LD) pump. The strong fluorescence peaks is at 1030 nm wavelength where the absorption of pumping energy is weak, and it is the wavelength of the laser output normally. In other embodiments, the laser gain medium 50 may also be a Nb:YAG disk with a thickness of 0.2 to 0.5 mm and a doping concentration of 1.0 at % to 5.0 at %. Then the wavelength of the pumped light emitted from the pump source 10 is 980 nm, and the wavelength of the excited light is 1064 nm.

In the illustrated embodiment, the heat dissipating medium 55 has a round disk shape, which is similar to that of the laser gain medium 50. The heat dissipating medium 55 is made of YAG crystal (Yttrium Aluminitum Garnet, $Y_3Al_5O_{12}$), which is an excellent substrate material for laser with several advantages, such as stable performance, hard texture, good optical properties, high thermal conductivity, and good heat dissipation performance. A thickness of the heat dissipating medium 55 is twice as much as that of the laser gain medium 50, i.e. 1 mm. Since the laser gain medium 50 is too thin to be clamped by a mechanical equipment, bonding the heat dissipating medium 55 and the laser gain medium 50 can increase the thickness, such that it can be easily clamped by the equipment. Moreover, other than ordinary optical glass, a refractive index of the heat dissipating medium 55 is the same as that of the laser gain medium 50, and after bonding, refraction effect will not occur when light passes through the bonding interface of these two round disks. Since the refractive indexes are the same, light will travel in straight lines, which is relatively easy to oscillate back and forth in the laser harmonic oscillator cavity 80, and generate laser.

Figure 4B:
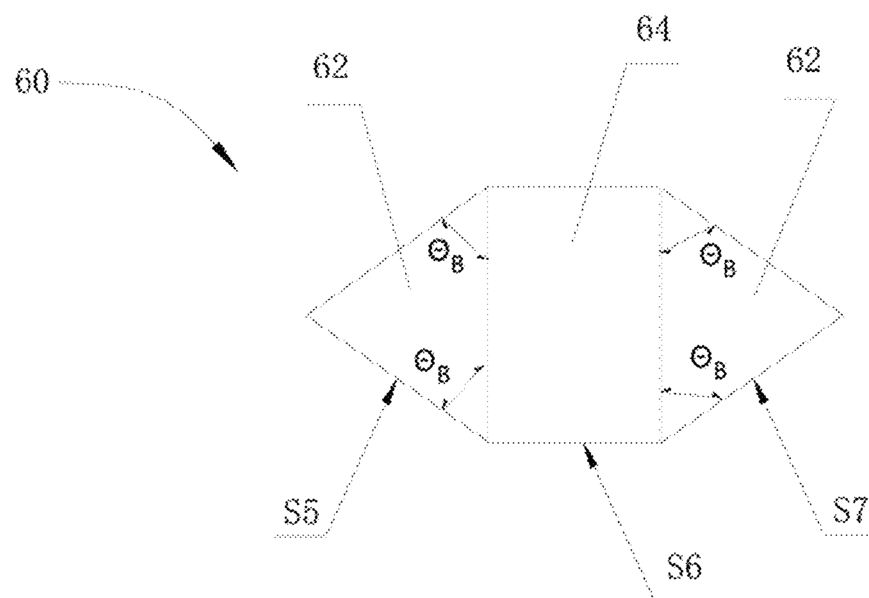
FIG. 4*b* is a perspective exploded view of the laser gain medium and the heat dissipating medium as shown in FIG. 3.

Referring to FIG. 4*b*, the Brewster double axial cone 60 is made of YAG crystal. The Brewster double axial cone includes two pyramids 62 facing each other, and a column

64 connected to the two pyramids 62. In the illustrated embodiment, the pyramid 62 is a cone and the column 64 is a cylinder. YAG crystal has an index of refraction of 1.82 for 1030 nm photons, the angle formed between the conical surface and the bottom surface of the vertebral body 64 is a Brewster's angle, i.e. $\theta_B$=61.2134°. In other embodiments, the Brewster double axial cone 60 may also be made of fused silica, which has an index of refraction of 1.45 for 1030 nm photons, and the Brewster's angle is calculated $\theta_B$=55.4°.

In the illustrated embodiment, a surface S1 of the laser gain medium 50 away from the Brewster double axial cone 60 is provided with a first two-wavelength coating 51 by coating, which is highly reflective in respect to incident light and highly reflective in respect to outgoing light. Specifically, the first two-wavelength coating is highly reflective at 940 nm laser and highly reflective at 1030 nm laser at an angle of incidence $\theta_i$=32.4268°. The purpose of being highly reflective at 940 nm laser is to allow pumped light at 940 nm that are not totally absorbed to reflect and enter the laser gain medium 50 again, and then enter the disk pump head, repeatedly reflect back and forth in the laser gain medium 50 until the pumped light energy is totally absorbed by the laser gain medium 50. The purpose of being highly reflective at 1030 nm laser is to allow the light at 1030 nm to oscillate back and forth in a Fabri-Perot laser harmonic oscillator cavity 80 formed between the S1 surface of the laser gain medium 50 and the output lens 70.

Surface S2 of the laser gain medium 50 close to the Brewster double axial cone 60 is provided with a second two-wavelength coating 53 by coating, which is highly transmissive at 940 nm laser and highly transmissive at 1030 nm laser. The purpose of being highly transmissive at 940 nm laser is to allow the pumped light at 940 nm to effectively pump to the laser gain medium 50 through the surface S2. The purpose of being highly transmissive at 1030 nm laser is to allow the light at 1030 nm oscillating back and forth to enter the pump region through the surface S2, so that the photon number is amplified.

A highly transmissive coating at 1030 nm laser is coated on two bottom surfaces S3 and S4 of the heat dissipating medium 55, in order to minimize the reflection loss when the oscillating 1030 nm light goes through the heat dissipating medium 55.

A highly transmissive coating 62 at 1030 nm wavelength is coated on two conical surfaces S5 and S7 of the vertebral body 64 of the Brewster double axial cone 60, the purpose of which is to minimize the reflection loss when parallel component light of the oscillating 1030 nm light goes through the Brewster double axial cone 60. The cylindrical surface S6 of the Brewster double axial cone 60 is a rough surface, which is convenient for clamping and fixing, and since the light only transmits in the Brewster double axial cone 60, coating is not necessary to this surface.

Figure 5:
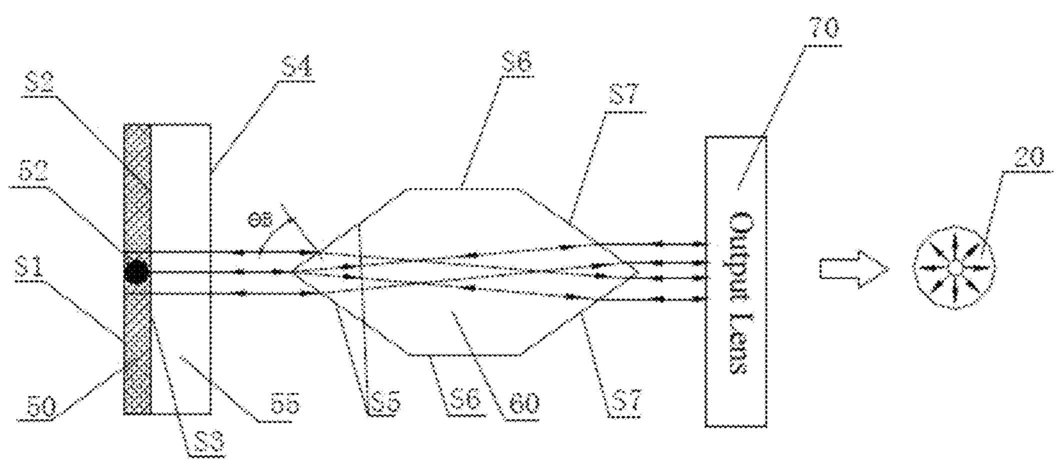
FIG. 5 illustrates a schematic propagation path of photons inside and outside of the Brewster double axial cone and the laser gain medium.

FIG. 5 is a schematic diagram of the propagation path of laser photons inside and outside of the laser gain medium 50 and the Brewster double axial cone 60. The Fabri-Perot laser harmonic oscillator cavity 80 is formed by the S1 surface of the laser gain medium 50 and the output lens 70, the Yb:YAG disk is used as the laser gain medium 50, while the Brewster double axial cone 60 is used to restrain the vertical component light (S-polarized light) in the harmonic oscillator cavity 80, and pick up the parallel component photon (P-polarized light) so that it can vibrate in the harmonic oscillator cavity 80.

After the 940 nm pump laser emitted from the pump source 10 goes through the collimator lens 20 and focusing lens 30, a focal spot is focused on the S1 surface of the laser gain medium 50. The focal spot is also called a laser pump gain region 52. The 1030 nm light oscillating back and forth in the harmonic oscillator cavity 80 all go through this laser pump gain region 52, and the photon number will be amplified once each time when it goes through the laser pump gain region 52.

After being pumped by the laser pump gain region 52, laser of 940 nm wavelength is excited into 1030 nm laser and parallel emitted from the heat dissipating medium 55, and parallel incident from air to the Brewster double axial cone 60 at Brewster's angle ($\theta_B$=61.2134°), Light reflection and refraction will occur when laser is on the conical surface S5 dividing the air and the YAG crystal, a part of the vertical component light (s-polarized light) is lost when reflected by the conical surface S5 into the air, while the rest of the vertical component light (s-polarized light) and all the parallel component light (p-polarized light) enter the YAG double cone 16 through the conical surface S5. Such light transmits along a straight line in the Brewster double axial cone 60, the vertical component light (S-polarized light) and the parallel component light (P-polarized light) remain unchanged in proportion. When the light goes through the conical surface S7 of the Brewster double axial cone 60, reflection and refraction of light will occur at the division surface S7 of the Brewster double axial cone 60 and the air. A part of the vertical component light (s-polarized light) is lost when reflected by the S7 surface into the Brewster double axial cone 60, while the rest of the vertical component light (s-polarized light) and all the parallel component light (p-polarized light) parallel enter the air at Brewster's angle through the conical surface 57 of the Brewster double axial cone 60. In the air, the light is transmitted along the rectilinear propagation and incident to the output lens 70, and the lens output 70 makes the light return through the original road at Brewster's angle and enter the Brewster double axial cone 60 again, successively go through the conical surfaces S7 and S5, the vertical component light (S-polarized light) will be respectively reflected and lost on the conical surfaces S7 and S5, while the rest of the vertical component light (S-polarized light) and all the parallel component light (P-polarized) parallel emit at Brewster's angle through the Brewster double axial cone 60. The 1030 nm light oscillates in the optical resonance oscillation cavity 80, and goes through the Brewster conical surfaces four times (goes through the S5 surface and the S7 surface two times respectively) during each oscillation. The lost of the vertical component light (S-polarized light) is much greater than that of the parallel component light (P-polarized light). The light oscillating back and forth in the resonance oscillation cavity 80 goes through the YAG Brewster double axial cone 16 many times, finally, the vertical component light (S-polarized light) is totally lost, while the parallel component (P-polarized light) is amplified by going through the pump gain region. When the gain of the light is greater than the loss of the light in the resonance oscillation cavity 80, since the Brewster double axial cone 60 is a special circular cone axis symmetric structure, the laser plane output mirror will output a radially polarized laser beam 20.

The principle of pumping of this laser will be described below.

Figure 6:
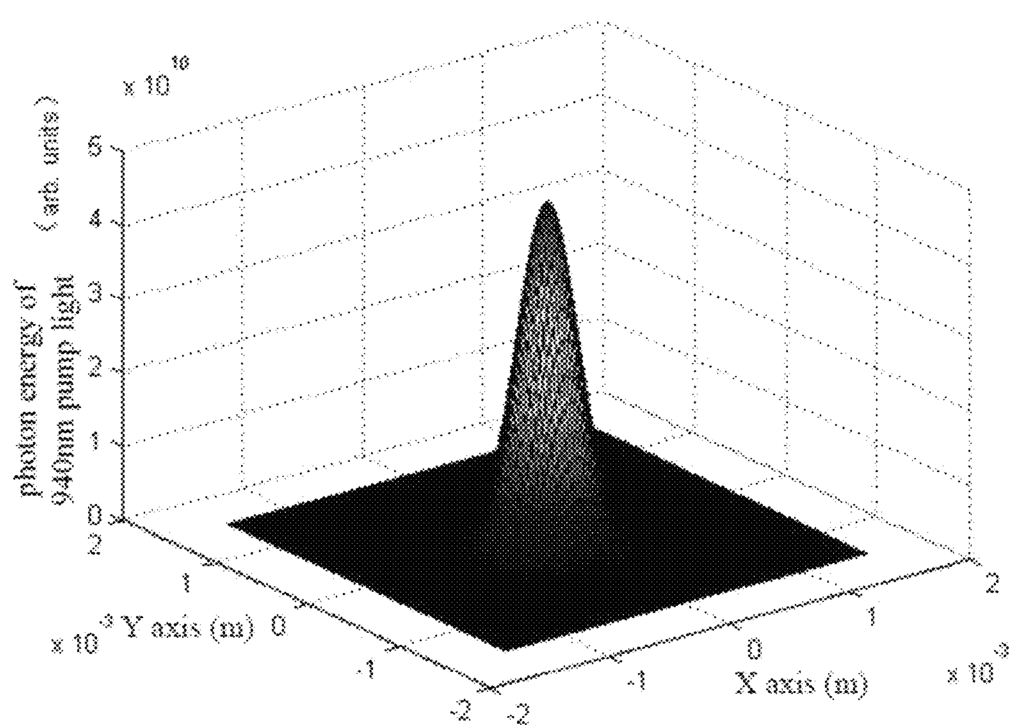
FIG. 6 is a Gaussian distribution model of pumped photons' energy by 940 nm pump source.

The laser gain medium 50 used by the laser is an Yb:YAG disk with a thickness of 0.5 mm, and a doping concentration of 5.0 at %, and an LD laser with a wavelength of 940 nm is used as the pump source. The energy distribution of 940 nm pumped light is shown in FIG. 6, and the pumped light's energy distribution of photons follows a Gaussian distribution model.

When using 940 nm laser to pump laser gain medium 50, Yb:YAG laser crystal as the gain medium will absorb the pumping energy, the absorption function is $\eta_\alpha=1-\exp(\alpha*l)$, where $\alpha$ is absorption coefficient, and l is the thickness of Yb:YAG disk or the length of the Yb:YAG rod. For Yb:YAG disk with a doping concentration of 5.0 at %, the absorption coefficient $\alpha$ is 5.6 $cm^{-1}$.

Figure 7:
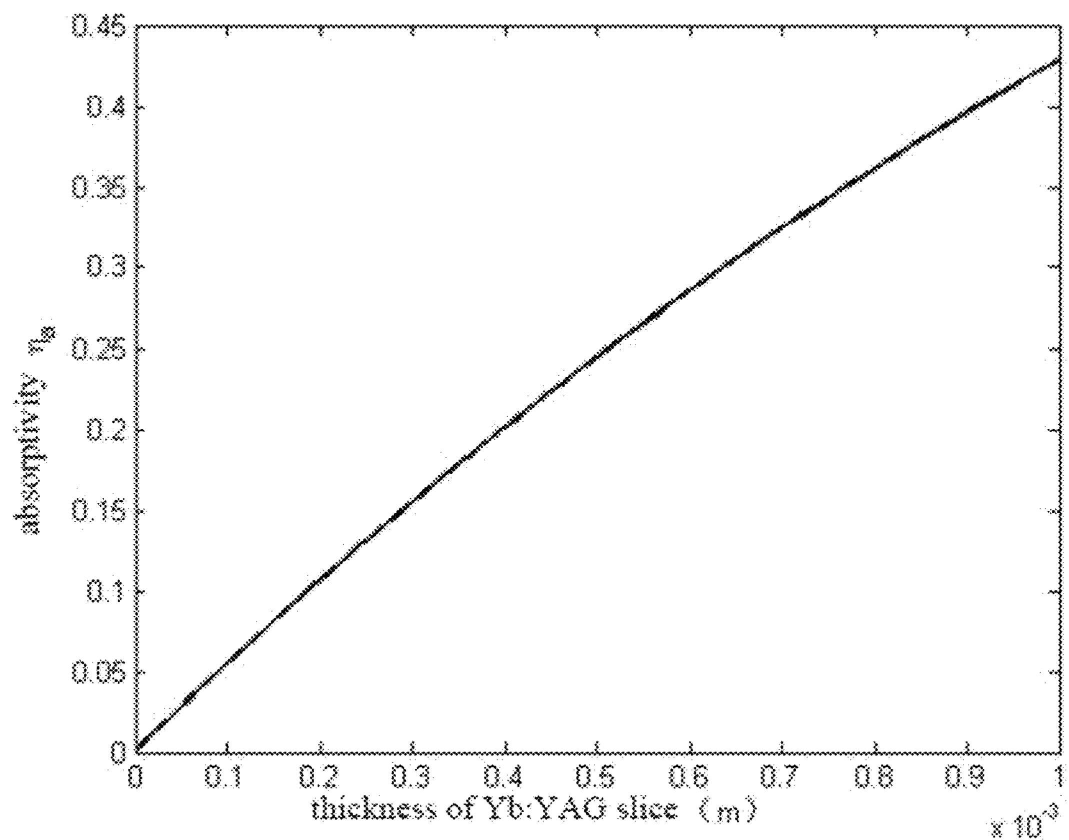
FIG. 7 shows the pumped photons' energy distribution of 940 nm pumped light by single-end pumped Yb:YAG rod-like crystal with 10 nm length.
Figure 8:
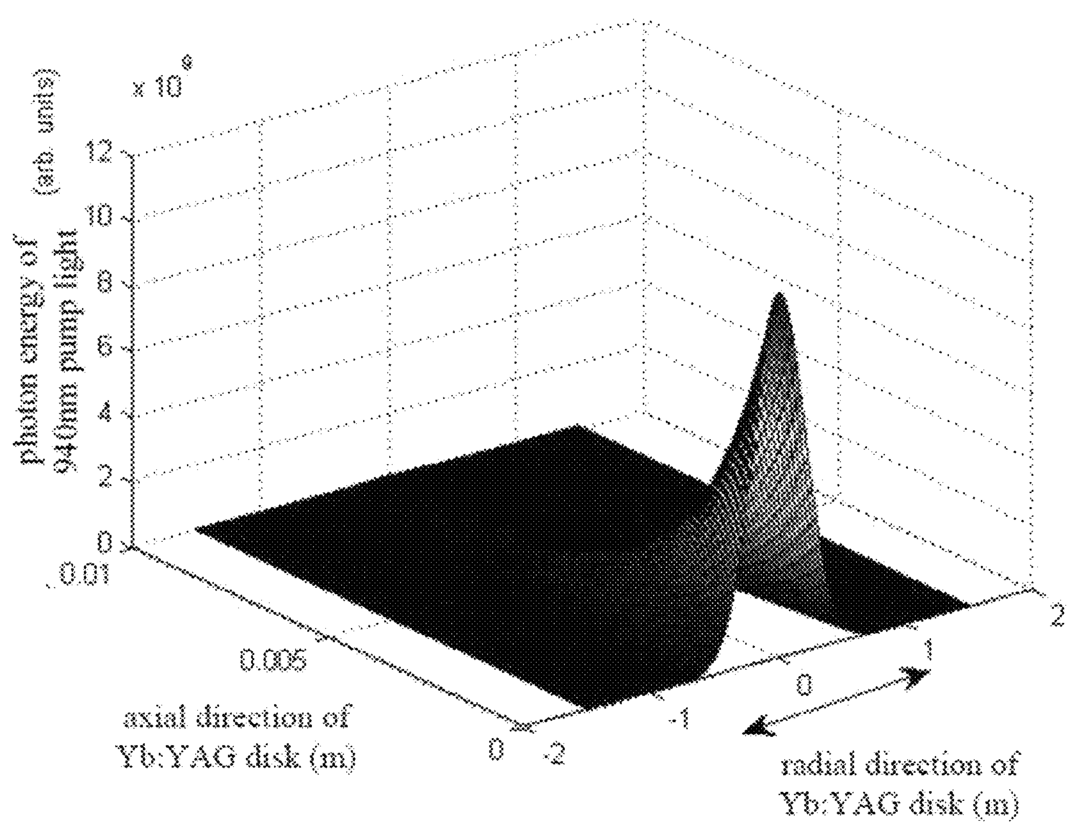
FIG. 8 shows the absorption of 940 nm pumped light by Yb:YAG rod-like crystal with a length of 10 mm.

FIG. 7 shows the pumped photons' energy distribution of 940 nm laser with 10 mm long Yb:YAG rod-like crystal, and the corresponding absorption function with the length of Yb:YAG rod-like crystal is shown as FIG. 8. It can be seen from FIG. 7 and FIG. 8 that, at 10 mm along the axial direction of the Yb:YAG crystal rod, 940 nm photons are almost zero, which means that by using 940 nm wavelength laser single-end pumped Yb:YAG crystal rod with 10 nm length, the crystal rod can absorb the pumping energy totally, and reach the maximum of laser output power when using the laser with this laser crystal.

Figure 9:
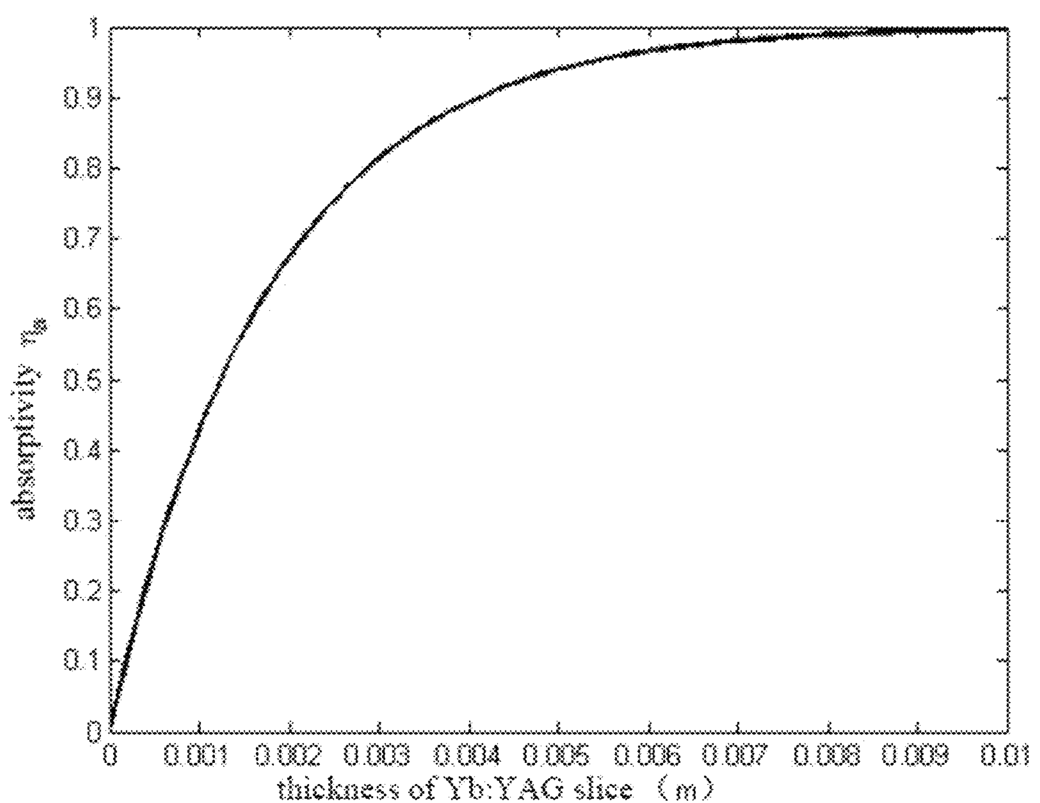
FIG. 9 shows the pumped photons' energy distribution of 940 nm pumped light by single-end pumped Yb:YAG disk with a thickness of 0.5 mm.
Figure 10:
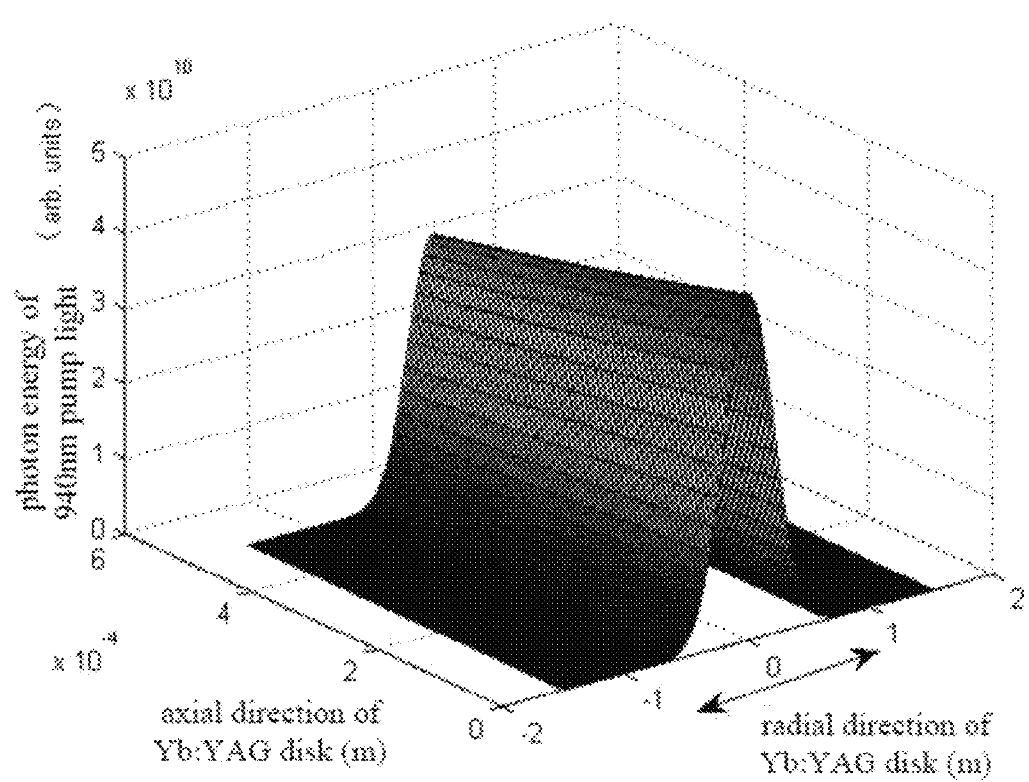
FIG. 10 shows the absorption of 940 nm pumped light by Yb:YAG disk crystal.

FIG. 9 shows the pumped photons' energy distribution of 940 nm pumped light by single-end pumped Yb:YAG thin disk with a thickness of 0.5 mm, and the corresponding absorption function of pumped laser with the thickness of Yb:YAG thin disk is shown as FIG. 10. It can be seen from FIG. 9 and FIG. 10 that, when using 940 nm laser and Yb:YAG thin disk with a thickness of 0.5 mm, according to the absorption function $\eta_\alpha=1-\exp(\alpha*l)$, wherein $\alpha$ is absorption coefficient, l is the thickness of Yb:YAG thin disk, the absorbed pumped energy by single-pumped disk is $\eta_\alpha=1-\exp(\alpha*l)=1-\exp(-0.56*0.5)=24.42\%$, and 75.58% of the pumped energy is not absorbed. It can be seen from the 940 nm photons' distribution by single-end pumping that, apparently most of the pumped photons are not absorbed. It can be seen from FIG. 10 that, the thickness of the Yb:YAG disk will affect its absorption of the pumped light; and the absorption is 24.42% for 940 nm laser with the Yb:YAG disk having a thickness of 0.5 mm and a doping concentration of 5.0 at %, and absorption is 42.88% for 940 nm laser with the Yb:YAG disk having a thickness of 1 mm and a doping concentration of 5.0 at %.

According to the pumping way of conventional disk laser, i.e. the pumped light not absorbed by single pumped thin disk will be reflected by a total reflection mirror fixed to the other side, and pass the pumping disk gain medium again; for the Yb:YAG thin disk with a thickness of 0.5 mm, effective pumping length is twice of the thickness of the thin disk, i.e. 1 mm, and the absorption of pumped light is 42.88%, and more than half (57.12%) of the pumping energy is not absorbed. In order to improve the laser output power of the radial polarization laser, it is necessary to improve the energy absorption of the pumping laser.

Figure 11:
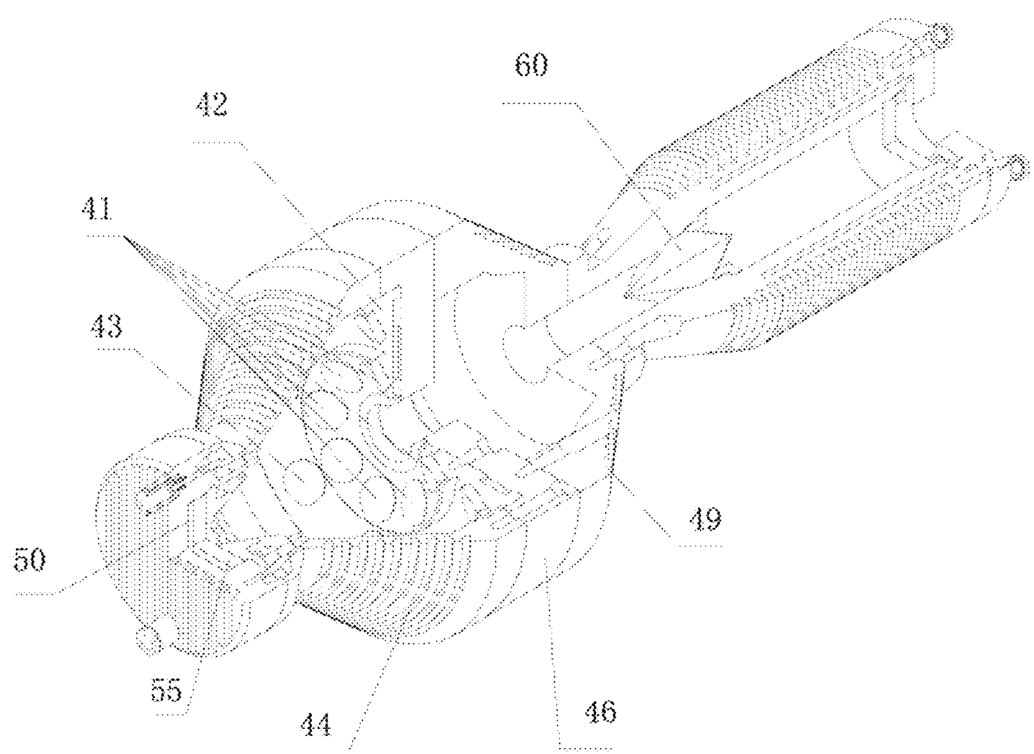
FIG. 11 is a partial perspective cross-sectional view of the optical resonance cavity.

In order to improve the absorption, in the illustrated embodiment, at the pumping side of the laser gain medium 50 (the side away from the Brewster double axial cone 60), a concave reflector group 40 with fifteen concave reflectors is provided, and the fifteen concave reflectors are coated with high-reflection coating at 940 nm. Referring to FIG. 11, the concave reflector group 40 includes seven inner reflectors 41 and eight outer reflectors 43. The seven inner reflectors 41 and the focusing lens 30 are arranged to form an inner ring, which is symmetrical in respect to an axis of the Brewster double axial cone 60. The eight outer reflectors 43 mirrors are arranged to form an outer ring surrounding the inner ring. Through laser pump source 10 and focusing lens 30, focal point is focused on laser gain medium 50, and the unabsorbed pumped light is totally reflected from surface S2 of laser gain medium 50 into the air, and then is reflected back to laser gain medium 50 by the fifteen concave reflectors of the concave reflector group in sequence; and by using this pumping structure (one focusing lens+fifteen concave reflectors), the pumped light will have 31 times (=15*2+1) of pumping 0.5 mm thick thin disk, so that the effective pumping length is around 31*0.5=15.5 mm, and the pumping light absorption is $\eta_\alpha$=1−exp(−α*l)=1−exp(−0.56*15.5) =99.98%, which means that pumping light is almost absorbed in total by 5.0 at % Yb:YAG thin disk, and the absorption of the pumped light by laser gain medium is dramatically increased, so as to maximize the output power of radially polarized laser beam. It can be understood that, the concave reflector group 40 can be omitted.

Figure 12:
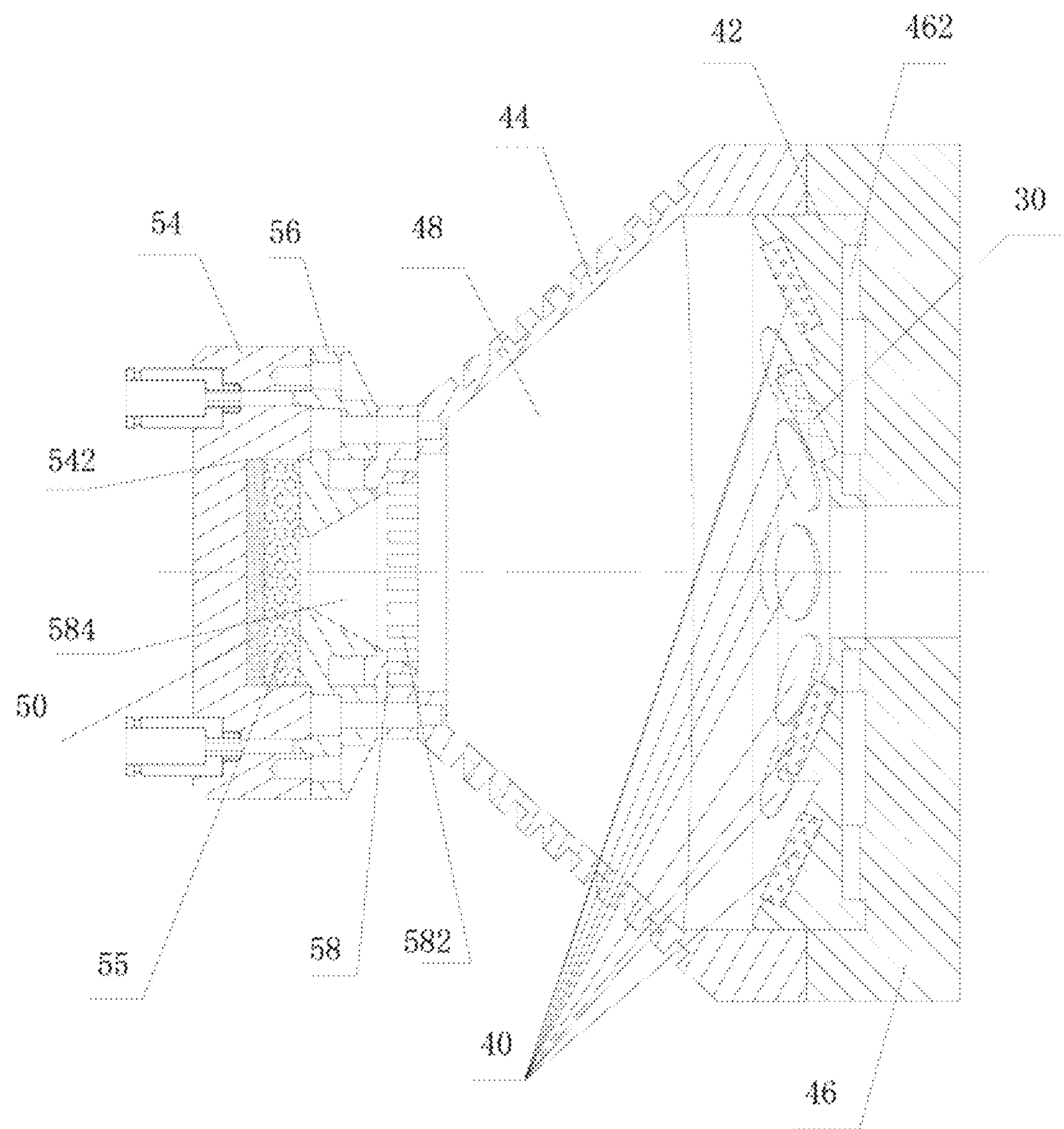
FIG. 12 is a cross-sectional view of the concave reflector group and the pump head.
Figure 13:
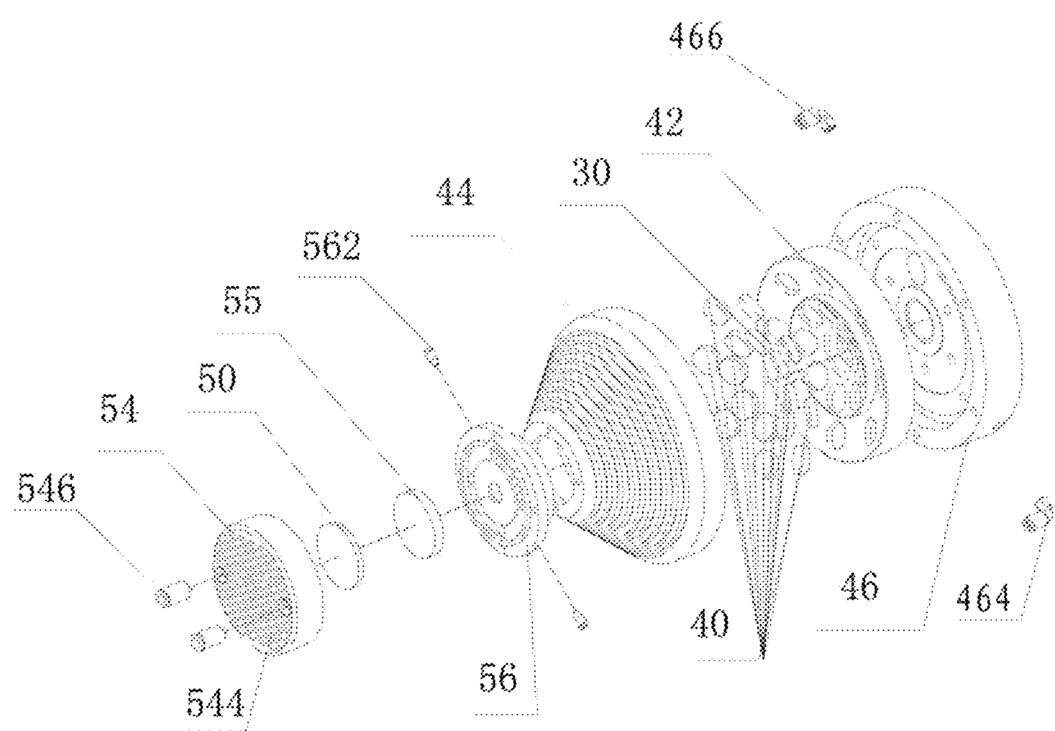
FIG. 13 is a perspective exploded view of the concave reflector group and the pump head.

In order to prevent the damage of optical lens by high energy pump, it is necessary to dissipate the heat of the concave reflector group 40. Referring to FIG. 12 and FIG. 13, according to this embodiment, the radial polarization disk laser 100 further includes a lens holder 42, a pump head 44, and a first sealing cover 46. The first sealing cover 46 is shaped substantially as a disk, and the pump head 44 is a hollow cone substantially matching with the first sealing cover 46. The pump head 44 and the first sealing cover 46 cooperatively form a pumping chamber 48 to accommodate the lens holder 42. The lens holder 42 is substantially a two-layer disk, and the concave reflector group 40 is fixed to the lens holder 42. Specifically, the seven inner reflectors 41 and the focusing lens 30 are arranged at the inner cycle of the lens holder 42, and eight outer reflectors 43 are arranged at the outer cycle of the lens holder 42. A channel 462 for cooling water circulation is formed between the first sealing cover 46 and the lens holder 42. The first sealing cover 46 is further provided with an inlet connector 464 and an outlet connector 466 which are connected to channel 462, so as to form a coolant circulation system.

The generation of polarized light will be further described below.

Figure 14:
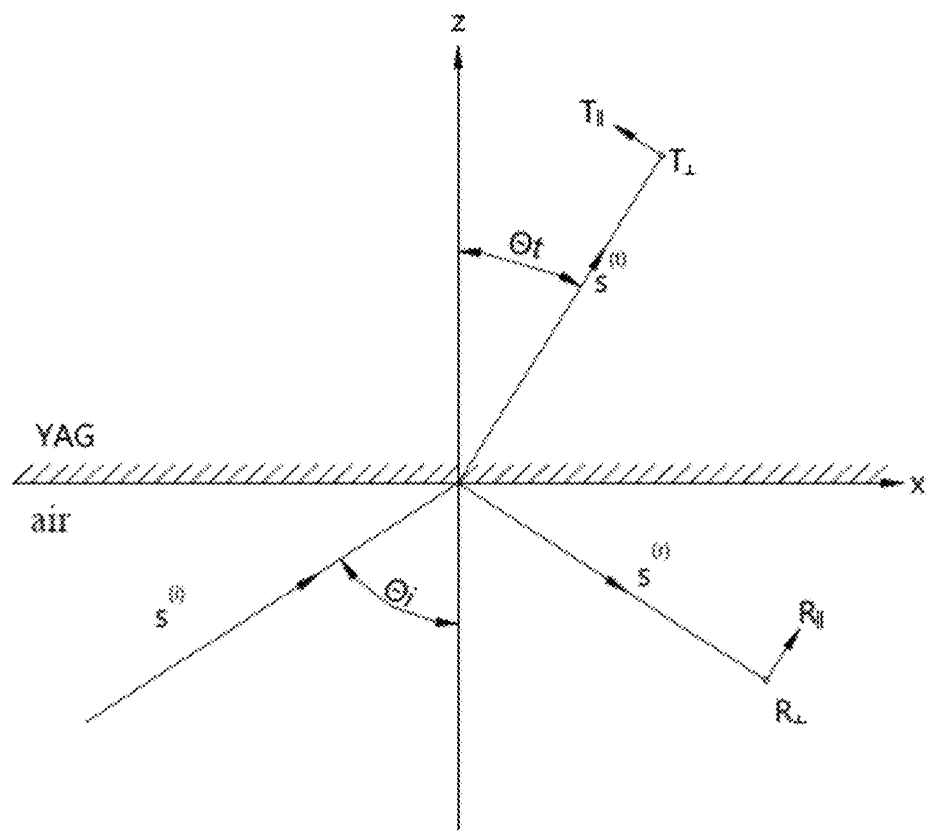
FIG. 14 is a schematic diagram of the refraction and the reflection of plane wave incident to the air and the YAG medium.

It is well known that light is a type of an electromagnetic wave. Referring to FIG. 14, and as a plane wave; light has reflection and refraction phenomenon when incident on the interface between air and YAG medium. As shown in FIG. 14, $S^{(i)}$ is incident light, $S^{(r)}$ is reflected light, and $S^{(t)}$ is transmitted light. The Brewster double axial cone 60 is made of YAG crystal, and the index of refraction is 1.82 to photons with 1030 nm wavelength. According to Fresnel equations, when light enters YAG or Nd:YAG medium from air and is refracted and reflected, the equations to calculate transmission rate and reflectivity rate are as follows:

$$R_{//} = \frac{\tan^2(\theta_i - \theta_t)}{\tan^2(\theta_i + \theta_t)} \quad (1)$$

$$R_{\perp} = \frac{\sin^2(\theta_i - \theta_t)}{\sin^2(\theta_i - \theta_t)} \quad (2)$$

$$R_{//} + T_{//} = 1 \quad (3)$$

$$R_{\perp} + T_{\perp} = 1 \quad (4)$$

wherein $T_{//}$ is the parallel component of transmission rate, and $T_{\perp}$ is the vertical component of transmission rate, $R_{//}$ is the parallel component of reflectivity rate, $R_{\perp}$ is the vertical component of reflectivity rate, $\theta_i$ is the angle of incidence when light is incident on axial cone surface, $\theta_t$ is the angle of refraction when light is incident on axial cone surface.

Light reflection and refraction effect occur when the light incident on the YAG crystal from the air at incident angle $\theta_i$, the refraction angle of which is $\theta_t$, and the reflectance of the parallel component is $$R_{//} = \frac{\tan^2(\theta_i - \theta_t)}{\tan^2(\theta_i + \theta_t)},$$

while the reflectance of the vertical component is $$R_{\perp} = \frac{\sin^2(\theta_i - \theta_t)}{\sin^2(\theta_i + \theta_t)}.$$

When light is incident to the air from the YAG crystal at incident angle $\theta_t$, light reflection and refraction effect will also occur, the refraction angle of which is $\theta_i$, and the reflectance of the parallel component is still $$R_{//} = \frac{\tan^2(\theta_i - \theta_t)}{\tan^2(\theta_i + \theta_t)},$$

while the reflectance of the vertical component is still $$R_{\perp} = \frac{\sin^2(\theta_i - \theta_t)}{\sin^2(\theta_i + \theta_t)}.$$

Figure 15:
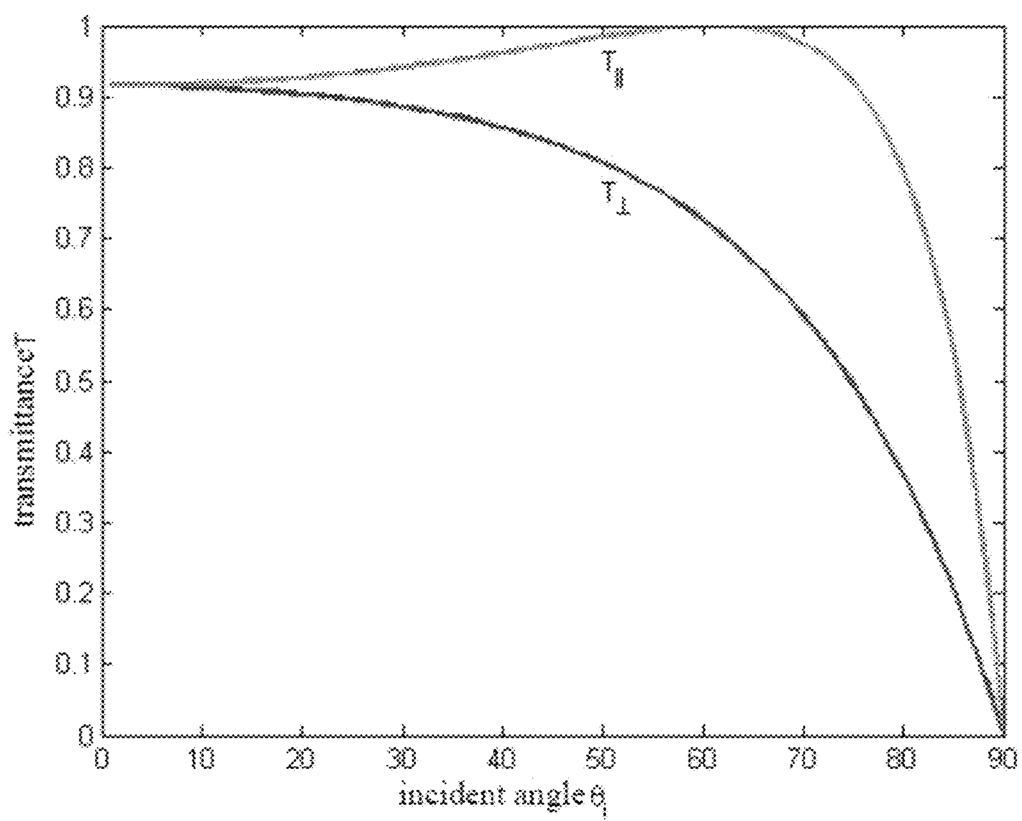
FIG. 15 shows the curve of reflectivity rate changing with incident angle $\theta_i$ when the light entering the YAG medium from the air.
Figure 16:
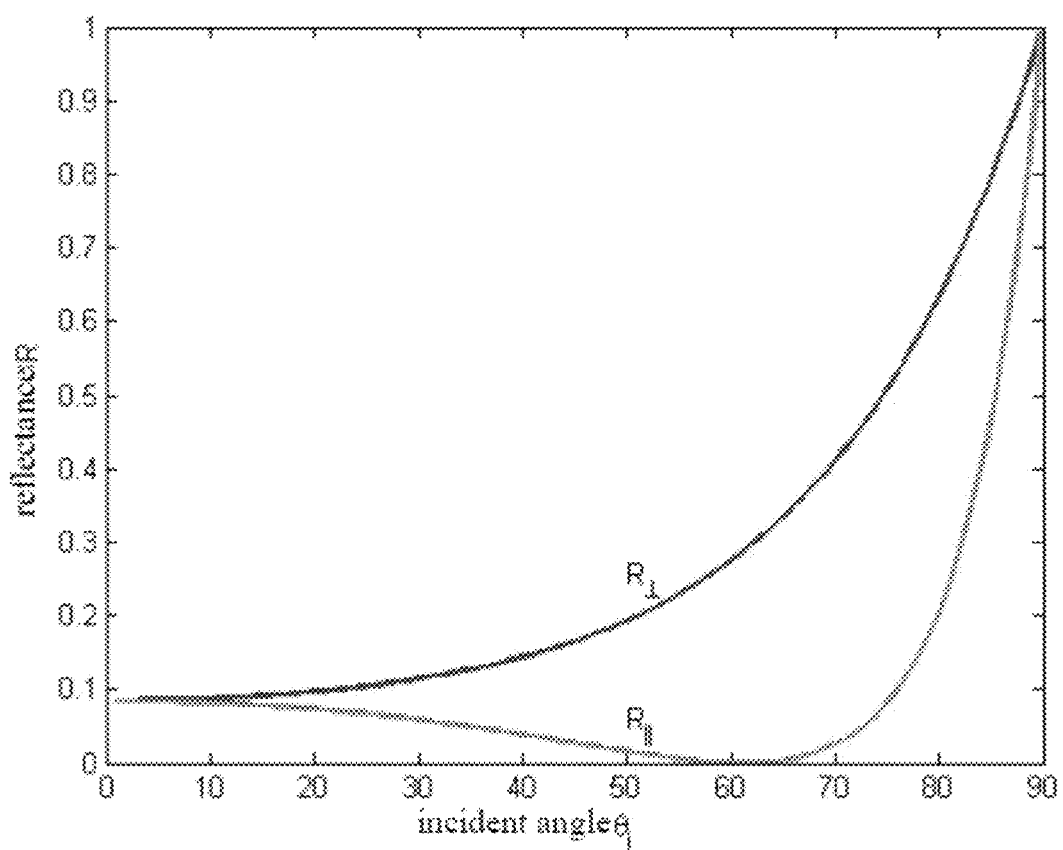
FIG. 16 shows the curve of transmission rate changing with incident angle $\theta_i$ when the light entering the YAG medium from the air.

When light is incident on the YAG crystal from the air at Brewster's angle $\theta_B$=61.2134°, calculate according to the equations (1), (2), (3), and (4), function curve of reflectance and transmittance shown in FIG. 15 and FIG. 16, the reflectance of the vertical component is 28.75%, and the transmittance of the vertical component is 71.25%, while the reflectance of the parallel component is 0, and the transmittance of the parallel component is 1, no reflection lost, i.e. a part of the vertical component and all the parallel component enters the YAG crystal from the air. When light is incident to the air from the YAG crystal at Brewster's angle $\theta_B$=61.2134°, calculate according to the equations (1), (2), (3), and (4), function curve of reflectance and transmittance shown in FIG. 15 and FIG. 16, the reflectance of the vertical component is 28.75%, and the transmittance of the vertical component is 71.25%, while the reflectance of the parallel component is 0, and the transmittance of the parallel component is 1, no reflection lost, i.e. a part of the vertical component and all the parallel component enters the air form the YAG crystal.

Figure 17:
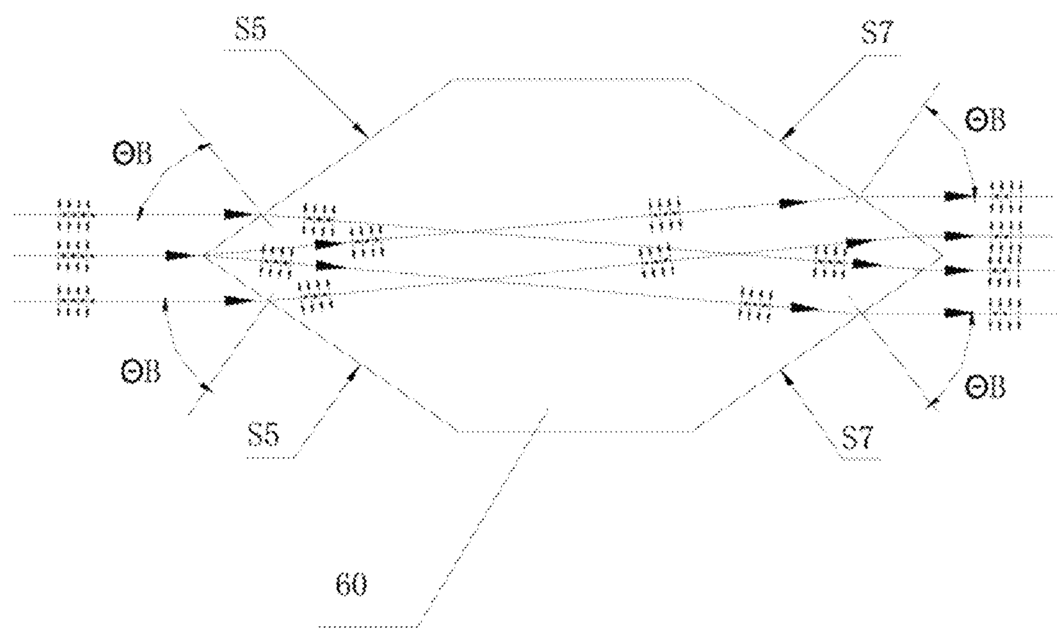
FIG. 17 is a schematic diagram of the polarization state change when the light transmitting in the Brewster double axial cone.

FIG. 17 shows a schematic diagram of the polarization state change when the light transmitting in the Brewster double axial cone, wherein "•" represents vertical component photons, i.e. S-polarized light, "↕" represents parallel component photons, i.e. P-polarized light. 940 nm light from pump source passes focusing lens 30, and focal point is on focused on laser gain medium 50; and a Fabry-Perot resonator is formed between the laser gain medium 50 and the output lens 70, and the laser gain medium 50 is excited by pumping and emitting photons with 1030 nm wavelength centered on the pumping region (focal spot of pumped light) 52. As shown in FIG. 5, only the photons along the propagation path inside and outside of the Brewster double axial cone and the laser gain medium can oscillate back and forth in the laser harmonic oscillator cavity 80. All photons along other propagation path are restrained because they are lack of conditions to oscillate back and forth in the cavity.

According to the above discussion, when the light goes through the Brewster double axial cone 60 once, the light goes through the two Brewster conical surface twice. The first time is when the light parallel incidents from the air at Brewster's angle to the conical surface S5 and enters the Brewster double axial cone 60, the conical surface 55 will reflected off a part of the vertical component light to the air, while another part of the vertical component light and all the parallel component light goes from the air to the YAG crystals. The second time is when the light goes from the conical surface S7 of the Brewster double axial cone 60 and parallel emitted to the air at Brewster's angle, the conical surface S7 will reflect off a part of the vertical component light to the Brewster double axial cone 60, while another part of the vertical component light and all the parallel component light goes from the Brewster double axial cone 60 to the air. Therefore, when the light goes through the Brewster double axial cone 60, a part of the vertical component light (S-polarized light) is lost on the Brewster surface (the S5 surface and the S7 surface) through reflection, and another part of the vertical component light (S-polarized light) and all the parallel component light (P-polarized light) is parallel emitted from the Brewster double axial cone 60 to the air.

In order to improve the heat lens effect of the laser gain medium 50 of this radial polarization laser, it is necessary to dissipate the large amount of heat generated when 940 nm LD laser pumping the laser gain medium 50. Because YAG crystal is a good conductor of heat, therefore by bonding the heat dissipating medium 55 with the laser gain medium 50, the heat effect of laser gain medium 50 can be effectively improved, and thus the quality of laser output mode is improved.

Further, in the illustrated embodiment, in order to effectively protect the laser gain medium 50, Brewster double axial cone 60 and to improve the heat lens effect of laser gain medium 50, a heat sink device could be fixed to the pumping side of laser gain medium 50, to cool the large amount of heat generated by laser gain medium 50 through water-cooling by the heat sink device.

Referring again to FIG. 12 and FIG. 13, the radial polarization disk laser 11 of the illustrated embodiment further includes a heat sink device 54, a second sealing cover 56, and a cooling device 58.

The heat sink device 54 is made of red copper. One side of the heat sink device 54 is provided with a receiving cavity 542 used to receive the laser gain medium 50 and the heat dissipating medium 55, and the other side of the heat sink device 54 is provided with a strip structure 544 used to increase the heat dissipating area. The heat sink device 54 is further provided with a coolant circulation system 546 therein.

The second sealing cover 56 is shaped substantially as annular, and coolant circulation system 562 is provided inside. The second sealing cover 56 is fixed to a side of the heat sink device 54 by screw.

The cooling device 58 is substantially a hollow cylinder, whose surface is provided with a plurality of fins 582. The cooling device 58 is bonded to the second sealing cover 56. The cooling device 58 is also made of red copper. The cooling device 58 and second seal cover 56 are jointly started with a tapered hole 50 which points to a laser gain medium 50 to facilitate the focusing lens 30 to better focus the pump energy on the laser gain medium 584.

When the laser gain medium 50 is pumped by high power 940 nm pump source, the laser gain medium 50 absorbs a lot of pump energy, and produces a great amount of heat. The heat is cooled by circulating water through the heat sink device 54, the heat dissipating medium 55, the liquid circulation cooling system 546, and the coolant circulation system 562, so that the heat is timely taken away, and the laser gain medium 50 is protected from crack due to thermal stress, and the coating is protected from shedding.

The high power pump is used to pump the laser gain medium 50 in the illustrated embodiment, the high energy light oscillating back and forth through the Brewster double axial cone 60 will produce a lot of heat, which will produce thermal lens effect, causing the laser mode variation. Therefore, it is necessary to perform heat dissipating to the Brewster double axial cone 60.

Figure 18:
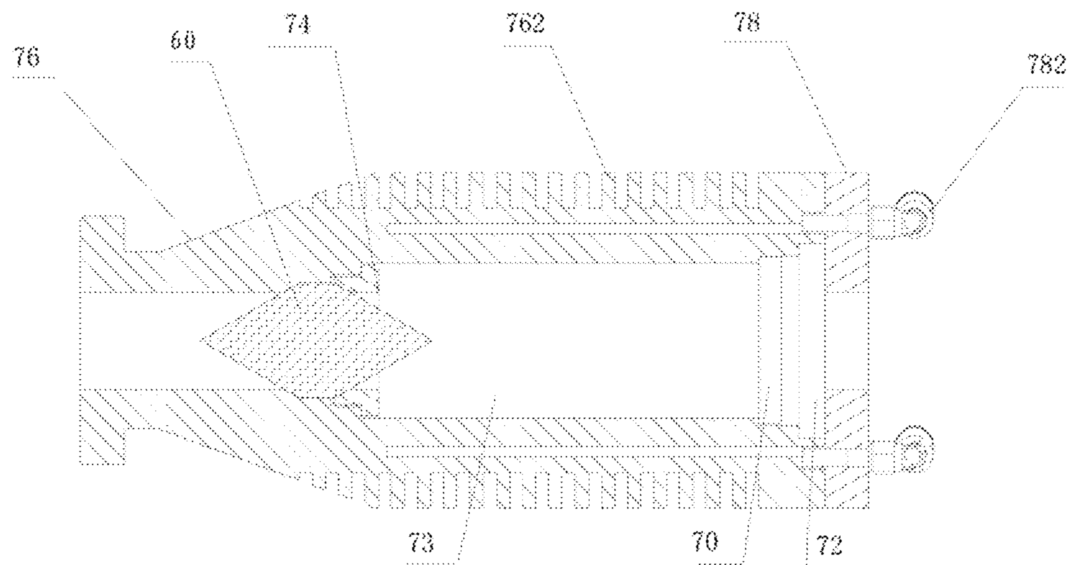
FIG. 18 is a cross-sectional view of the cooling device for the Brewster double axial cone.
Figure 19:
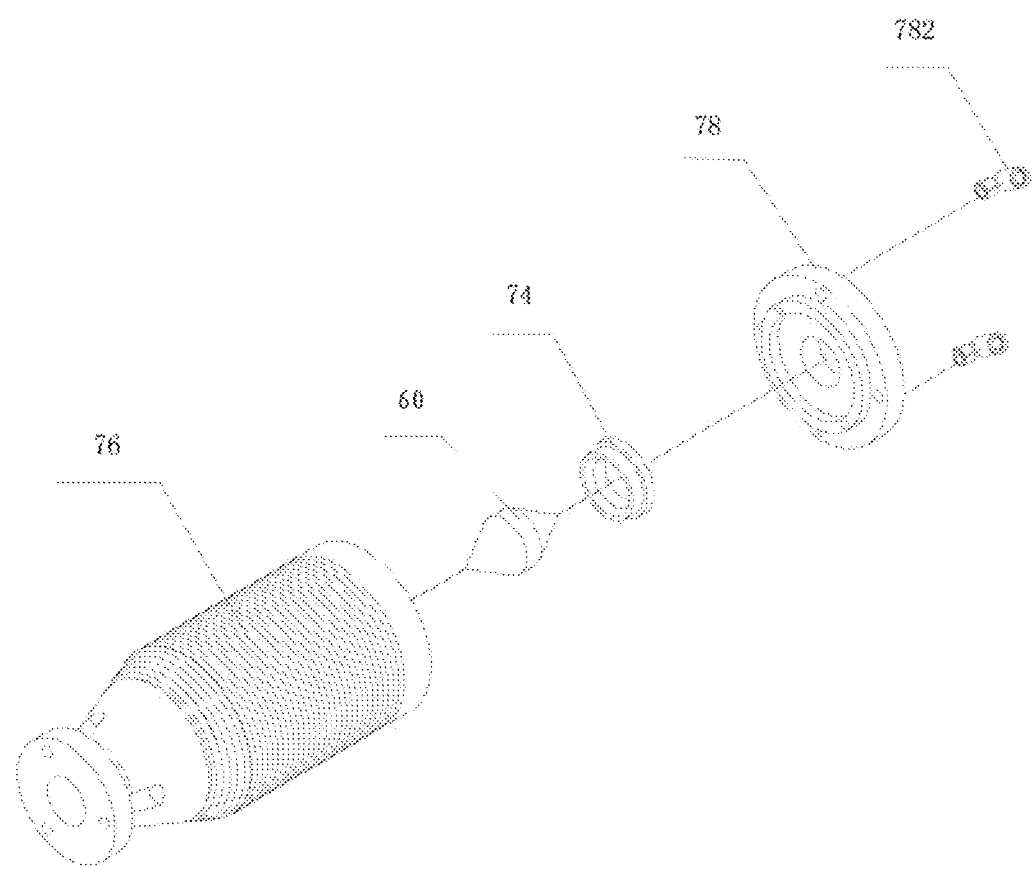
FIG. 19 is a perspective exploded view of the cooling device as shown in FIG. 18.

Referring to FIG. 18 and FIG. 19, the radial polarization disk laser 11 of the illustrated embodiment further includes a output lens barrel 76 and a third sealing cover 78.

The output lens barrel 76 is substantially a hollow cylinder, whose surface is provided with a series of fins 762. One end of the output lens barrel 76 and the third sealing cover 78 cooperatively form an output lens chamber 73. The Brewster double axial cone 60 is fixed to one end of the output lens chamber 73 via a cone pressure ring 74. The other end of the output barrel 76 is fixed connected to the first sealing cover 46 a cone-shaped second pump head 49 (shown in FIG. 11).

The output lens 70 is fixed to the other end of the output lens chamber 73. The third sealing cover 78 is further provided with a coolant liquid circulation system 782.

It is understood that, all the angles mentioned in this description, including the angle of incidence $\theta_i$=32.4268°, Brewster's angle $\theta_B$=61.2134°, can have ±2' of tolerance.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A radial polarization disk laser, comprising:

a pump source, a collimator lens, a focusing lens, a laser gain medium, a heat dissipating medium, a Brewster double axial cone, and a output lens, which are sequentially arranged along a laser light path, wherein the Brewster double axial cone comprises two cones facing each other and a cylinder connecting the two cones, an angle formed between a conical surface and a bottom surface of the cone is a Brewster's angle;

the laser gain medium is bonded to the heat dissipating medium;

the laser gain medium and the output lens form a laser harmonic oscillator cavity therebetween;

wherein pumped laser emitted from the pump source passes through the collimator lens and the focusing lens, is then focused on the laser gain medium, and generated photons oscillate in the laser harmonic oscillator cavity, and then a radially polarized laser beam is finally output by the output lens.

2. The radial polarization disk laser of claim 1, wherein the laser gain medium is a Yb:YAG disk with a doping concentration of 5.0 at % to 15 at % or the laser gain medium is an Nd:YAG disk with a doping concentration of 1.0 at % to 5.0 at %, and the Yb:YAG disk or the Nd:YAG disk has a thickness of 0.2 to 0.5 mm.

3. The radial polarization disk laser of claim 2, wherein the heat dissipating medium is made of YAG crystal, a thickness of the heat dissipating medium is twice as much as a thickness of the laser gain medium.

4. The radial polarization disk laser of claim 2, wherein the Brewster double axial cone is made of YAG crystal, and the Brewster's angle is 61.2134°±2'.

5. The radial polarization disk laser of claim 2, wherein the Brewster double axial cone is made of quartz, and the Brewster's angle is 55.4°±2'.

6. The radial polarization disk laser of claim 2, further comprising a concave reflector group disposed at a side of the laser gain medium away from the Brewster double axial cone; wherein the pumped laser not absorbed by the laser gain medium is reflected by the concave reflector group, and then enters the laser gain medium again.

7. The radial polarization disk laser of claim 6, wherein the concave reflector group comprises seven inner reflectors and eight outer reflectors, the seven inner reflectors and the focusing lens are arranged to form an inner ring which is symmetrical in respect to an axis of the Brewster double axial cone; and the eight outer reflectors are arranged to form an outer ring surrounding the inner ring.

8. The radial polarization disk laser of claim 2, wherein one surface of the laser gain medium away from the Brewster double axial cone is provided with a first two-wavelength coating, which is highly transmissive in respect to incident light and highly reflective in respect to outgoing light; and the other surface of the gain medium close to the Brewster double axial cone is provided with a second two-wavelength coating, which is highly reflective in respect to incident light and highly transmissive in respect to outgoing light.

9. The radial polarization disk laser of claim 2, wherein both bottom surfaces of the heat dissipating medium are respectively provided with a coating highly transmissive in respect to outgoing light.

10. The radial polarization disk laser of claim 2, wherein both conical surfaces of the Brewster double axial cone are respectively provided with a coating highly transmissive in respect to outgoing light.

11. The radial polarization disk laser of claim 6, further comprising a lens holder, a first pump head, and a first sealing cover;

wherein the first pump head and the first sealing cover cooperatively form a pumping chamber to accommodate the lens holder;

the concave reflector group is fixed to the lens holder; and the first sealing cover is provided with a coolant circulation system therein.

12. The radial polarization disk laser of claim 2, further comprising a heat sink device, a second sealing cover, and a cooling device;

wherein the heat sink device defines a receiving chamber on a side thereof to accommodate the laser gain medium and the heat dissipating medium;

the second sealing cover is fixed to the side of the heat sink device, the cooling device is attached to the second sealing cover, the diffusing device and the second sealing cover are both provided with coolant circulation systems.

13. The radial polarization disk laser of claim 12, wherein both the cooling device and the second sealing cover are provided with a tapered hole pointing towards the laser gain medium.

14. The radial polarization disk laser of claim 2, further comprising an output lens barrel and a third sealing cover;

wherein an end of the output lens barrel and the third sealing cover cooperatively form an output lens chamber;

the Brewster double axial cone is fixed to one end of the output lens barrel, the output lens is fixed to the other end of the output lens barrel, and the output lens barrel is provided with a coolant circulation system.

15. The radial polarization disk laser of claim 1, wherein the pumped laser emitted from the pump source has a wavelength of 940 nm.

16. The radial polarization disk laser of claim 1, wherein the radially polarized laser beam has a wavelength of 1030 nm.

* * * * *